United States Patent [19]

Bartlett

[11] Patent Number: 5,234,669
[45] Date of Patent: Aug. 10, 1993

[54] RECOVERY OF NON-FERROUS METALS FROM SMELTER FLUE DUSTS AND SLUDGES

[75] Inventor: Robert W. Bartlett, Moscow, Id.
[73] Assignee: Idaho Research Foundation, Inc., Moscow, Id.
[21] Appl. No.: 743,491
[22] Filed: Aug. 8, 1991
[51] Int. Cl.$^5$ .............. C01G 9/00; C01G 53/00; C01G 51/00; C01G 3/00
[52] U.S. Cl. .............. 423/140; 423/150.1; 423/153; 423/101; 423/109; 423/110; 423/27; 423/34; 423/47; 423/42
[58] Field of Search .............. 423/87, 32, 150.1, 140, 423/153, 109, 110, 35, 27, 101, 47, 34, 42; 75/725, 726, 738

[56] References Cited

U.S. PATENT DOCUMENTS 4,073,862 2/1978 Haese .............. 423/220

FOREIGN PATENT DOCUMENTS 1502775 3/1978 United Kingdom.

OTHER PUBLICATIONS

Chemical Abstracts, vol. 94, 1981 p. 196 94:18763b.
Ahmadzai et al., "Oxidation Aspects of the Lime-Concentrate-Pellet Roasting Process," Metallurg. Trans. 14B:589-604 (1983).
Bartlett and Haung, "Fluidized Bed Roasting of Lime Copper Concentrate Pellets," Mettalurg. Trans. 7B:489-490(1976).
Haung and Bartlett, "Oxidation Kinetics of a Lime--Copper Concentrate Pellet," Metallurg. Trans. 7B:369-374 (1976).
Taylor et al., presentation at the 113th Meeting of the American Institute of Mining Engineering, Los Angeles, 1984.
Haver and Wong, "Lime Roast-Leach Method for Treating Chalcopyrite Concentrate," USDI Report No. 8006 (1975).
Haver and Wong, "Making Copper Without Pollution," Mining Eng. pp. 52-53 (Jun. 1972).
Bartlett and Haung, "The Lime-Concentrate-Pellet Roast Process for Treating Copper Sulfide Concentrates," J. Metals, pp. 28-34 (Dec. 1973).
Taylor et al., "Lime Roasting of Pyrite," presentation at the Annual Meeting of the Society of Mining Engineers, Salt Lake City, Utah (Feb. 18, 1990).
Kunda et al., "Production of Copper From the Amine Carbonate System," in Ehrlich (ed.), Copper Metallurgy, The Minerals, Metals and Materials Society, pp. 27-69 (1970).
Keck et al., "Leaching Composites of Five Plating Wastes with Ammonium Carbonate," in Gaskell (ed.), EPD Congress '90, The Minerals, Metals and Materials Society, pp. 529-538 (1990).
Twidwell and Mehta, "Disposal of Arsenic Bearing Copper Smelter Flue Dust," Nucl. and Chem. Waste Mgmt. 5:297-303 (1985).
Taylor et al., "Lime Roasting of Refractory Precious Metal Ores," in Jennings (ed.), Precious Metals, The Minerals, Metals and Materials Society, pp. 725-742 (1991).

Primary Examiner—Theodore Morris
Assistant Examiner—Edward Squillante
Attorney, Agent, or Firm—Klarquist, Sparkman, Campbell, Leigh & Whinston

[57] ABSTRACT

Methods are disclosed for treating smelter flue dust and other smelter by-products so as to recover non-ferrous metals therefrom and convert arsenic and sulfur in the flue dust into non-leachable compounds. The methods allow the flue dust and other smelter by-products such as smelter sludges to be disposed of in a natural environment without subsequent leaching of heavy metals, sulfur, and arsenic. The smelter by-products are mixed with hydrated lie, formed into agglomerates, and roasted at an optimal temperature of about 650° C. to form oxidized arsenic and sulfur which react with the lime in the agglomerates to form non-leachable compounds. The roasted agglomerates are contacted with a basic lixiviant comprising dissolved ammonia and an ammonium salt to dissolve non-ferrous metals such as copper from the roasted agglomerates. Used lixiviant can be boiled to precipitate the non-ferrous metals dissolved therein and vaporize the ammonia, thereby regenerating the lixiviant. Leaching is preferably performed in a leaching cell used as the final repository of the leached agglomerates.

35 Claims, 4 Drawing Sheets

RECOVERY OF NON-FERROUS METALS FROM SMELTER FLUE DUSTS AND SLUDGES

BACKGROUND OF THE INVENTION

Smelting of metal ores generates smelter by-products such as flue dusts and sludges that typically contain substantial amounts of environmentally hazardous substances such as sulfur, arsenic, and heavy metals. Hence, flue dusts and sludges are regarded by the United States Environmental Protection Agency (EPA) as hazardous materials requiring safe methods for disposal. This is because the hazardous substances in flue dusts and sludges can leach therefrom by rain and other natural waters and may contaminate groundwater.

Unfortunately, known disposal processes adaptable to smelter flue dusts and sludges are expensive. Also, the only disposal method for copper-smelter flue dust currently acceptable to the EPA comprises recycling the dust to the smelter, which can be prohibitively deleterious to the quality of copper produced by the smelter. Furthermore, known disposal processes that allow recovery of valuable metals from flue dust and smelter sludges entail capital and operating costs that exceed the revenue obtainable from the recovered metal. As a result, some smelter operators currently stockpile flue dust and sludge in anticipation that more economical disposal methods will be developed. Other smelter operators forego resource recovery entirely in favor of storage of the dust or sludge in licensed hazardous waste sites. Costs of these disposal methods are prohibitively high for many smelter operators.

Hence, there is a need for methods for treating smelter flue dusts and sludges that permit recovery of valuable metal therefrom while converting other hazardous constituents thereof into non-leachable compounds.

There is also a need for such methods that permit environmentally safe disposal of smelter flue dust and sludge, thereby eliminating the need to stockpile or encapsulate the flue dust or sludge.

There is also a need for such methods that do not produce toxic or hazardous by-products.

There is also a need for such methods that are low-cost.

SUMMARY OF THE INVENTION

The present invention meets the aforementioned needs by providing, according to one aspect of the present invention, a method for treating sulfur- and arsenic-containing flue dust so as to allow recovery of nonferrous metals such as copper, zinc, and nickel therefrom while converting the sulfur and arsenic therein to non-leachable compounds. Such a method is comprised of the following steps:

(a) mixing the flue dust with hydrated lime and forming the mixture into particulate agglomerates such as pellets;

(b) roasting the agglomerates in air to oxidize arsenic and sulfur which react with lime in the agglomerages to form insoluble calcium compounds of arsenic and sulfur in the agglomerates;

(c) leaching the roasted agglomerates with a basic lixiviant solution comprising ammonia and an ammonium salt to dissolve copper, zinc, and nickel from the roasted agglomerates, thereby producing a "pregnant liquor" enriched with dissolved copper, zinc, and nickel;

(d) separating the pregnant liquor from the leached agglomerates;

(e) heating the pregnant liquor sufficiently to vaporize the ammonia and precipitate basic compounds of copper, zinc, and nickel therefrom; and (f) disposing of the leached agglomerates The aforementioned method can also be utilized, according to another aspect of the present invention, for treating a smelter sludge so as to recover commercially valuable non-ferrous metals therefrom while converting sulfur and arsenic in the sludge to non-leachable compounds.

To ensure complete conversion of sulfur and arsenic to insoluble calcium compounds, the flue dust or sludge is mixed with at least a stoichiometric amount of hydrated lime.

The mixture of hydrated lime and flue dust or sludge is mixed with a sufficient amount of water to form a viscous paste that can be formed into agglomerates.

Roasting of the agglomerates is performed at about 450° to about 800° C. The roasting temperature must not be so high that the non-ferrous metals targeted for recovery from the agglomerates form insoluble compounds. For example, a preferred roasting temperature for copper-containing agglomerates is about 650° C. Roasting oxidizes and volatilizes arsenic and sulfur, whereupon the volatilized compounds react with the hydrated lime in the agglomerates to form non-leachable calcium compounds of arsenic and sulfur Valuable non-ferrous metals remain in a leachable form in the agglomerates during the roasting step. Iron and heavy metals are hydrolyzed to non-leachable compounds.

According to another aspect of the present invention, leaching is performed using a basic lixiviant solution of ammonia and an ammonium salt The ammonium salt can be any of a wide variety of ammonium salts including, but not limited to, ammonium chloride, sulfate, or nitrate. Preferably, ammonium carbonate is not used for leaching due to its ability to dissolve arsenic from the agglomerates. Optimal leaching pH is between 10 and 11. No acids are used or generated.

According to another aspect of the present invention, leaching of the agglomerates is preferably performed by heap- or vat-leaching in one or more leaching cells, where the leaching cell is used, after leaching is complete, as the final disposal repository of the leached agglomerates.

According to another aspect of the present invention, leaching forms a pregnant liquor enriched with one or more non-ferrous metals leached from the agglomerates. The pregnant liquor is preferably heated, typically by boiling, to vaporize ammonia therefrom and precipitate basic compounds of the non-ferrous metals. The precipitates can be removed from the liquid for recovery by filtering or other suitable solid-liquid separation method. The vaporized ammonia is preferably condensed and used to re-form the basic lixiviant solution.

DETAILED DESCRIPTION

Figure 1:
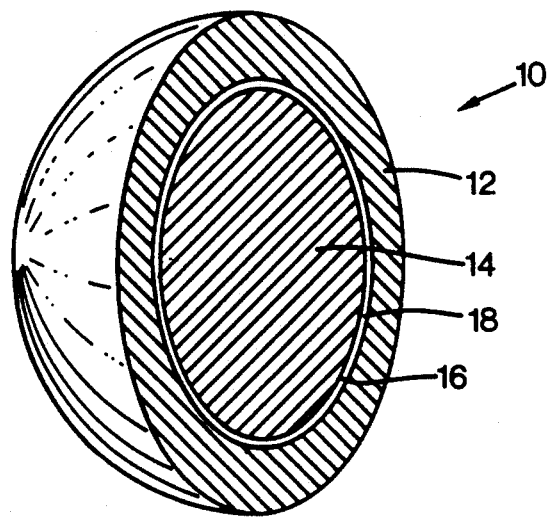
FIG. 1 is a schematic sectional view of a partially roasted pellet.

Flue dust is a finely divided particulate mixture comprising ore particles, condensates, and other solid substances generated during smelting Twidwell and Mehta, *Nucl & Chem. Waste Mgmt* 5:297-303 (1985). Flue dust composition can vary widely among different smelters; however, flue dusts generally contain substantial amounts of sulfur, arsenic, non-ferrous metals including copper, zinc, and nickel, as well as certain "heavy metals" such as iron and lead The metal composition of a particular flue dust will, of course, depend upon the source of the ore that was smelted The principal ore metals in flue dust are generally in the form of both sulfides and sulfates. Arsenic is mainly in the form of oxides (e.g., arsenic trioxide, $As_2O_3$). The particle size of flue dust is substantially minus 400 mesh (Tyler), which is sufficiently fine to form a paste when mixed with water and lime.

Similarly, smelter sludges generally contain substantial amounts of sulfur, arsenic, non-ferrous metals, and heavy metals. The relative amounts of these substances present in a smelter sludge depends upon the type and source of ore processed by the smelter. If necessary, smelter sludge can be comminuted to yield a particle size distribution suitable for forming a paste when combined with water and lime.

As used herein, a "smelter by-product" is used generally to denote a flue dust or sludge generated during smelting. Either is treatable, according to the present invention, so as to allow recovery of non-ferrous metal therefrom and conversion of arsenic and sulfur in the by-product to a non-leachable compound.

Lime roasting as known in the art is used for converting copper sulfide flotation concentrates to cathode copper while minimizing discharge of sulfur dioxide ($SO_2$) into the atmosphere. Bartlett and Haung, *J. Metals* 25:2-8 (1973). In particular, the flotation concentrate, a finely particulate material having enriched amounts of copper sulfide per unit volume compared to naturally occurring copper ore, is mixed with lime, formed into agglomerates, and roasted. Roasting oxidizes the sulfur from the copper sulfide minerals, mainly to volatile sulfur dioxide gas. Roasting also oxidizes arsenides and volatilizes arsenic trioxide ($As_2O_3$).

Representative reactions for release of $SO_2$ during roasting are as follows:

The sulfur dioxide gas reacts with the lime in the agglomerates to form acid-insoluble calcium compounds within the agglomerates, thereby preventing release of the sulfur into the atmosphere. The roasted agglomerates comprise anhydrite (calcium sulfate, $CaSO_4$) and calcium sulfite ($CaSO_3$). The copper is converted during roasting to acid-soluble copper compounds that can be extracted from the roasted agglomerates without affecting the anhydrite.

Lime roasting of arsenopyrite can result in capture of arsenic as well as sulfur in the calcine Taylor et al., "Lime Roasting of Refractory Precious Metal Ores," in Jennings (ed.) *Precious Metals*, The Metallurgical Soc. (1991).

In accordance with one aspect of the present invention, flue dust is mixed with lime and pelletized or otherwise agglomerated before roasting Since flue dust is already in a finely particulate form, comminution of the dust before mixing with lime is normally not necessary. Smelter sludge, however, may require comminution before it is used to form agglomerates.

As used herein, "pellets" and "pelletizing" denote in general agglomeration and formation of agglomerates, respectively.

Pelletizing before roasting yields optimal sulfation kinetics during roasting. Haung and Bartlett, *Met. Trans.* 7B:369-374 (1974). Pellets typically roast from the outside inward. This is evidenced by a cross-sectional examination of a partially roasted pellet, as shown schematically in FIG. 1. Such a pellet 10 (shown as a sectioned half-pellet to clarify interior details) exhibits a roasted shell 12 surrounding an unreacted core 14. The core 14 shrinks in diameter and the shell 12 correspondingly thickens as roasting proceeds, until roasting is completed The sulfide oxidation rate in the pellet is controlled by diffusion of atmospheric oxygen through pores (not shown) in the roasted shell 12 to the surface 16 of the core 14, where $SO_x$ generated at the surface 16 from reaction of oxygen with sulfide tends to diffuse outward through the calcine shell 12. Ideally, before the $SO_x$ gas molecules have begun to pass very far through the shell 12, the $SO_x$ reacts with lime in the shell 12. Hence, formation of sulfates and sulfites in the pellet 10 occurs near an interface zone 18 separating the unreacted pellet core 14 from the roasted shell 12.

Uniformly sized pellets or other agglomerates are also advantageous during a subsequent leaching step of a method according to the present invention. As discussed in more detail hereinbelow, one way to perform the leaching step is by "heap leaching" in which a "lixiviant," or leaching, solution is typically applied to the top of an accumulation ("heap") of agglomerates. The high uniform permeability of the heap permits, during leaching, a substantially unhindered downward percolation of lixiviant solution through the heap. Also, since the lime-roasted agglomerates are porous, they absorb lixiviant solution by capillary action, thereby facilitating the dissolution and extraction of soluble metal from the pores and, as a result, from the agglomerates.

The form of the lime has a substantial effect on sulfur retention. Taylor et al., "Lime Roasting of Refractory Precious Metal Ores," in Jennings (ed.) *Precious Metals*, pp. 725-742, The Metallurgical Soc. (1991). Hydrating the lime (forming "hydrated lime" $Ca(OH)_2$) before roasting makes the lime more reactive during roasting and improves the capture efficiency of the lime for both sulfur and arsenic Hydrated lime is believed to be superior because: (a) a particle of hydrated lime has a diameter of about one micrometer, which gives each such particle a very high surface area which greatly facilitates the reactivity of the lime; and (b) hydrated lime loses water during roasting (described in further detail hereinbelow) to form a very reactive lime (CaO) in close proximity to sulfur.

There must be at least a stoichiometric amount of lime present in the agglomerates to ensure complete conversion of sulfur and arsenic to insoluble calcium compounds.

Any of a number of agglomerating, balling, and pellet-making devices known in the art can be used. A preferred appliance is a pugging extruder. Such an extruder hydrates the lime via addition of water and uniformly blends the hydrated lime with the flue dust. The amount of water should be sufficient to form the mixture of hydrated lime and flue dust into a viscous paste. The paste is compacted and pressure-extruded through a die plate to pelletize the paste (thereby forming "green" pellets) The diameter and, in the case of cylindrical pellets, the length of the pellets are determined by the particular configuration of the die plate used when the pellets are extruded.

For roasting, the green pellets are preferably loaded into a counter-current rotary kiln wherein they are slowly dried and roasted at a controlled temperature as they travel through the kiln Similar types of kilns are used for firing ceramic pastes. However, any analogous air-roasting furnace or reactor allowing adequate temperature control and that does not comminute the pellets would also suffice.

Excessive roasting temperatures must be avoided in order to prevent formation of metal compounds that are not soluble during subsequent leaching The optimum roasting temperature will vary with the specific composition of the flue dust or sludge in the agglomerates. Optimal roasting conditions for a particular flue dust or sludge can be readily ascertained by roasting samples of agglomerates formed of lime and the flue dust or sludge at various temperatures and roaster residence times and subsequently leaching the roasted samples to determine which sample yielded the highest extraction of metal from the agglomerates.

A final roasting temperature of about 650° C. is a preferred temperature for copper. However, good extractions of copper have been achieved between 450° C. and 800° C. A temperature of about 650° C. is also generally preferred for copper because hydrated lime readily loses water at about this temperature according to the following reaction:

$$Ca(OH)_{2(s)} = CaO_{(s)} + H_2O_{(g)}$$

Thus, highly reactive CaO is formed in situ where it is readily available for reaction with $SO_x$ gas and volatilized arsenic formed inside the core of the agglomerates during roasting.

As stated hereinabove, roasting causes oxidative release of $SO_x$ gas from sulfides. The $SO_x$ is locally captured by the hydrated lime, forming calcium sulfite ($CaSO_3$) and calcium sulfate ($CaSO_4$), respectively, according to the following reactions:

$$Ca(OH)_{2(s)} + SO_{2(g)} = CaSO_{3(s)} + H_2O$$

$$Ca(OH)_{2(s)} + SO_{3(g)} = CaSO_{4(s)} + H_2O$$

Thus, the reactions that form calcium sulfite and calcium sulfate are solid/gas reactions rather than solid/solid reactions. Because a gaseous intermediate, $SO_x$, is formed via reaction of atmospheric oxygen with ore sulfides, an intimate mixture of flue dust and hydrated lime is required to prevent escape of unreacted $SO_x$ gas and to obtain a high degree of sulfur capture. Such intimate mixture is achieved as described hereinabove by uniformly blending the hydrated lime with the flue dust to form a paste before forming agglomerates therefrom These principles are also applicable to reactions of lime with volatilized arsenic compounds.

Although the oxidation reactions described hereinabove are exothermic, additional input of thermal energy, such by combusting natural gas, may be required for many flue dusts since the dusts have already experienced partial oxidation to sulfates during generation of the flue dust in the smelter. Any sulfates present in the flue dust before lime roasting will also react with lime. Therefore, sulfates present in the flue dust must be considered in computing the amount of lime needed in the roaster charge. For example:

$$CuSO_4 + Ca(OH)_2 \rightarrow CuO_{(s)} + CaSO_{4(s)} + H_2O$$

Arsenic is captured during roasting by reactions that are believed to be similar to the sulfur reactions and that proceed excellently within the same temperature range:

$$3Ca(OH)_{2(s)} + As_2O_{3(g)} = Ca_3(AsO_3)_{2(s)}$$

$$Ca_3AsO_3)_{2(s)} + O_{2(g)} = Ca_3(AsO_4)_{2(s)}$$

In a commercial-scale application of a process according to the present invention, it is preferred that a slight excess of hydrated lime over the stoichiometric amount required for capture of all the arsenic and sulfur be added when making the agglomerates. This ensures complete capture of the arsenic and sulfur within the roasted agglomerates.

After roasting is complete, the roasted agglomerates are leached to recover commercially valuable non-ferrous metals such as copper, zinc, and/or nickel therefrom.

The leaching step according to one aspect of the present method is a significant departure from the prior art because no acid is used for or generated from the leaching step of the present method. Instead, leaching is performed using a basic lixiviant solution Because the lixiviant solution can be regenerated, it is not necessary to dispose of used lixiviant solution into the environment. Also, no hazardous by-products are generated.

In the prior art, various copper-containing materials have been leached using ammine carbonate solutions (ammonia plus ammonium carbonate). However, ammonium carbonate is unsatisfactory for leaching calcined pellets produced from arsenic-containing flue dust because ammine carbonate will partially dissolve arsenic, Robins, Met. Trans. 12B:103–109 (1981), while precipitating calcium carbonate by the following reaction:

$$Ca_3(AsO_4)_2 + 3(NH_4)CO_3 = 3CaCO_3(s) + 2(NH_4)_3AsO_4$$

Consequently, an ammonium salt having an anion that does not form insoluble calcium salts must be used to prevent arsenic dissolution. In principle, any such anion will suffice and is within the scope of the present invention.

Solutions of ammonium nitrate or ammonium chloride, as candidate ammonium salts, have been found to work well when the solution also included dissolved ammonia. The leaching reaction for cupric oxide using ammonia and ammonium nitrate is:

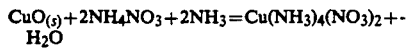

A similar leaching reaction using ammonia and ammonium chloride is:

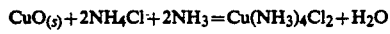

Ammonium sulfate can also be used, even though ammonium sulfate can form precipitates of calcium sulfate and can solubilize some arsenic. However, the concentration of dissolved arsenic tends to be low (see Table III) and may be environmentally acceptable. Thus, use of a lixiviant comprising ammonia plus ammonium sulfate is considered within the scope of the present invention.

Figure 2:
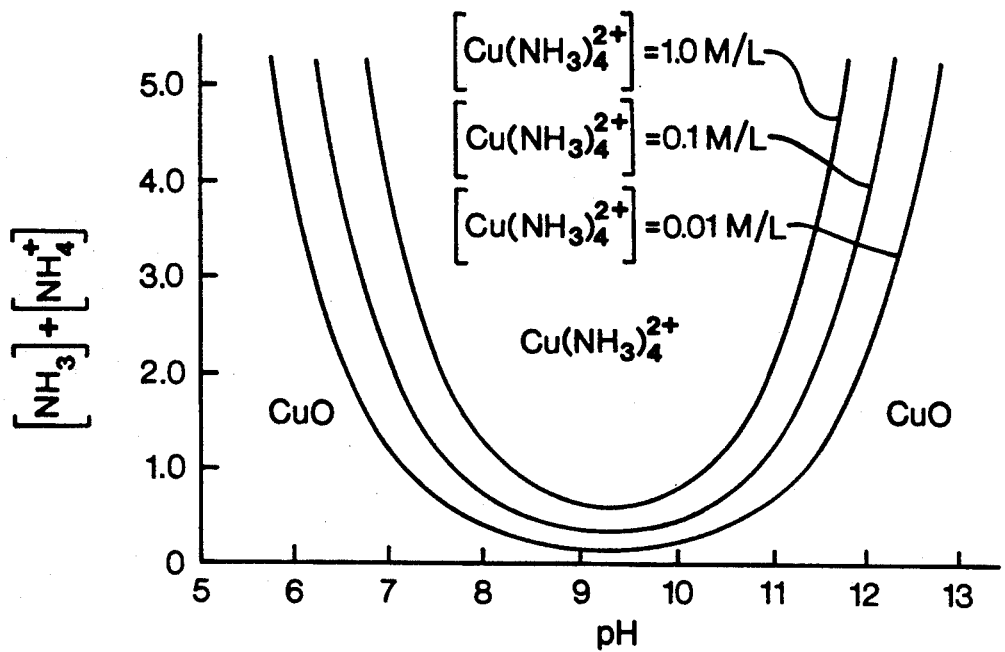
FIG. 2 shows plots of computed lixiviant pH values as a function of the concentrations of ammonia and ammonium ion for different concentrations of $Cu(NH_3)_4^{++}$ formed during leaching of roasted pellets.

In the above leaching reactions, the presence of an ammonium salt is necessary. The ammonium salt, when present with ammonia in the lixiviant, ensures that the charge-balancing anion for the cupric ammine complex $[Cu(NH_3)_4^{++}]$ is not hydroxyl ion. (The charge-balancing anion for the cupric ammine complex is hydroxyl if only aqueous ammonia is used as the lixiviant solution, in which case the lixiviant pH is above 12 due to the presence of hydroxyl anions.) The ammonium salt also helps maintain the lixiviant pH sufficiently low to keep the copper soluble while the copper is complexed with ammine. Plots showing computed pH values as a function of the concentrations of ammonia and ammonium ion for different concentrations of $Cu(NH_3)_4^{++}$ are shown in FIG. 2, as reproduced from Tozawa et al., "On Chemistry of Ammonia Leaching of Copper Concentrates," in Yannopoulos and Agarwal (eds.), *Extractive Metallurgy of Copper*, Chapter 36, The Metals Soc. (1976). As can be seen, the pH at which most of the copper is in the form of dissolved $Cu(NH_3)_4^{++}$ rather than non-dissolved CuO is about 9.25. FIG. 2 indicates that a pH range in which copper leaching can proceed is from about 7.5 to about 11, since $Cu(NH_3)_4^{++}$ is predominant within this range over CuO.

It has also been found that arsenic solubility in the leaching solution is at a minimum within a pH range of about 10 to 11. Within this pH range, arsenic is in the form of calcium arsenate, a stable solid. Fortunately, a pH of 10 to 11 is still within a range in which $Cu(NH_3)_4^{++}$ is predominant (FIG. 2). Therefore, a leaching pH of 10-11 is preferred. A further benefit of leaching at this basic pH is that iron and other heavy metals in the agglomerates form insoluble hydroxides while the nonferrous metals such as copper, zinc, nickel, and cobalt form soluble ammonia complexes to an appreciable extent.

Hence, the steps of lime-roasting and leaching permit recovery of non-ferrous metals such as copper, zinc, and nickel from the agglomerates while converting the flue dust or sludge in the agglomerates to a calcine-like substance amenable to permanent disposal in an environmentally acceptable manner. Arsenic and sulfur are converted to insoluble compounds. At a pH above about 10, other heavy metals in the agglomerates are entirely hydrolyzed and remain embedded in the calcine matrix. No solid waste other than the roasted agglomerates is generated. Copper, zinc, and nickel are dissolved during leaching by complexing with ammonia in the lixiviant solution. Iron and other heavy metals are not complexed or dissolved by the lixiviant. The leaching step, when configured as a closed system, has no water effluent.

Leaching of the roasted agglomerates is preferably conducted by vat or percolation heap leaching. Heap leaching is employed in the art for use in extracting gold from permeable ore heaps using basic sodium cyanide solutions. The sodium cyanide lixiviant solution is distributed evenly over the surface of the heap and allowed to percolate (without flooding) downward through the heap. The ore particles are wetted by the percolating solution which dissolves gold from the ore particles.

While fine particles are difficult to leach by percolation, large particles require enormous amounts of time to fully leach. Therefore, it is preferred that agglomerates leached according to the present invention have a substantially isometric shape and a median size within a range of about 0.1 to 5 cm (more preferably about one centimeter). Such agglomerates have been found to yield substantially complete leachings within reasonable times, where the lixiviant solution resides in the heap for a period of several weeks to several months.

Drip irrigation is one preferred method of applying an ammonia-containing lixiviant to the heap because drip irrigation inhibits ammonia vaporization. In drip irrigation, the lixiviant is preferably applied in the same manner as in conventional gold heap leaching, wherein flexible conduits (such as conduits made of plastic pipe) for delivering the lixiviant solution to the heap are arranged over the top of the heap. The conduits are equipped with drip emitters, as known in the art, for discharging the lixiviant solution from the conduits to the heap. The drip emitters are spaced apart in an array to adequately cover the heap area.

Figure 3A:
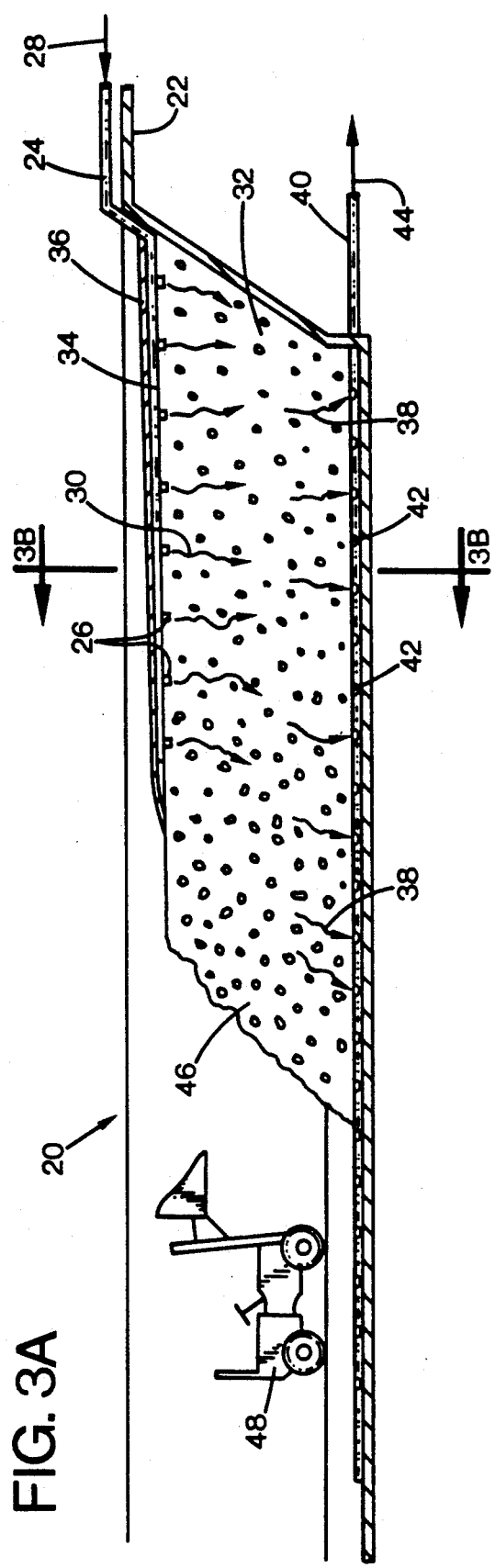
FIG. 3A is a side-elevation sectional view of a heap-leach cell.
Figure 3B:
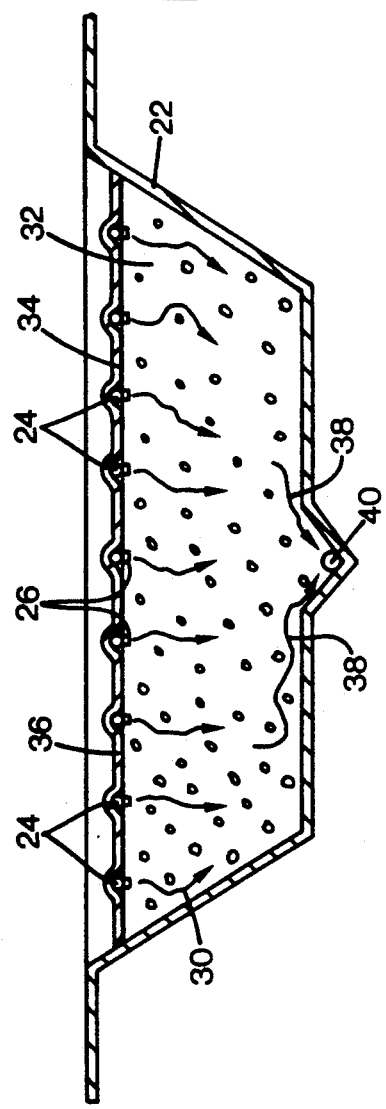
FIG. 3B is a transverse sectional view of the cell of FIG. 3A.

Preferably, to minimize capital and operating expense, heap leaching is conducted in a leaching cell that will serve as the final repository of the agglomerates after leaching is completed. This means that, after all the agglomerates in the cell have been leached, the cell and agglomerates can be sealed and covered with earth without further materials handling FIGS. 3A and 3B illustrate a representative leaching cell 20 for leaching a heap 32 of roasted agglomerates. (FIG. 3B is an end-sectional view of the cell shown in FIG. 3A.) The cell 20 is preferably located at a site where, after the cell 20 has been completely filled with roasted agglomerates and fully leached, it can be left in a filled condition, covered, then buried on site. Since the agglomerates therein are fully roasted and fully leached, any water percolating through the heap after burial will generate substantially no hazardous leachates.

The cell 20 is preferably provided with a full liquid-impervious lining 22 as known in the art. The cell 20 includes plural drip-irrigation conduits 24 as described hereinabove, each conduit 24 equipped with plural drip emitters 26. Lixiviant solution from a source thereof (not shown) is carried by the drip-irrigation conduits 24 and discharged therefrom through the drip emitters 26 into the heap. The lixiviant solution percolates through the heap 32, as shown by arrows 28.

To prevent loss of ammonia and evaporation of water, the conduits 24 and the top surface 34 of the heap 32 undergoing leaching may be overlaid with a cover sheet 36 impervious to liquid and ammonia. The impervious cover 36 may, if desired, be covered with a layer of earth (not shown) to protect it from wind and sunlight or for thermal insulation during winter months.

After percolating (arrows 38) through the heap 32, the lixiviant solution has acquired a substantial concentration of dissolved metal such as copper, zinc, and/or nickel leached from the roasted pellets. Hence, the liquid represented by the arrows 38 is termed a "pregnant liquor".

The cell 20 is also provided with a drain line 40 in a manner similar to a french drain known in the art. The pregnant liquor (arrows 38) exits the cell 20 by entering the drain line 40 through apertures 42 therein. The pregnant liquor is discharged (arrows 44) from the drain line 40 for collection.

As seen in FIG. 3A, a portion of the heap 32 can be undergoing leaching while fresh roasted agglomerates are piled on a new portion 46 of the heap 32. (A self-propelled loader 48 can be used to load the roasted agglomerates into the cell 20 to form the heap 32.) As the heap 32 is thus enlarged, the irrigation conduits 24 and covering 36 can be correspondingly extended or moved.

It is also possible to vat leach the roasted agglomerates. Vat leaching is similar to heap leaching except that, in vat leaching, a vat or cell holding roasted agglomerates is flooded with lixiviant solution rather than subjected to percolation of the lixiviant. In vat leaching, when the lixiviant solution flooding the agglomerates has acquired an adequate concentration of metal such as copper, zinc, and/or nickel, the resulting pregnant liquor is removed from the vat for subsequent boiling. As pregnant liquor is removed from the vat, more lixiviant solution can be added to the vat to maintain a constant volume therein. Lixiviant solution is replaced in the vat until most of the metal has been extracted from the agglomerates After the metal has been substantially fully extracted, all the remaining lixiviant solution is drained from the vat for recovery of the remaining metal from the solution. After vat-leaching is completed, the vat or cell containing the leached agglomerates can also be used as the final disposal repository for the leached agglomerates.

Both vat- and heap-leaching can employ two or more cells for leaching the roasted agglomerates In such a scheme, agglomerates undergoing leaching are passed sequentially from cell to cell. Lixiviant solution is preferably routed from cell to cell in a direction countercurrent to the agglomerates i.e., fresh lixiviant is introduced first to the cell containing the most extensively leached agglomerates, then to the cell containing agglomerates that have undergone a lesser degree of extraction.

When leaching of the agglomerates is completed, the agglomerates are preferably washed with water subsequently used to replace overall evaporative losses of the lixiviant. Washing removes any residual ammonia, thereby rendering any residual copper, nickel, or zinc in the agglomerates insoluble. Acids are never generated or used in the process according to the present invention. Sulfur and arsenic remain captured in the leached agglomerates without undergoing any chemical alteration during leaching with the basic lixiviant.

Figure 4:
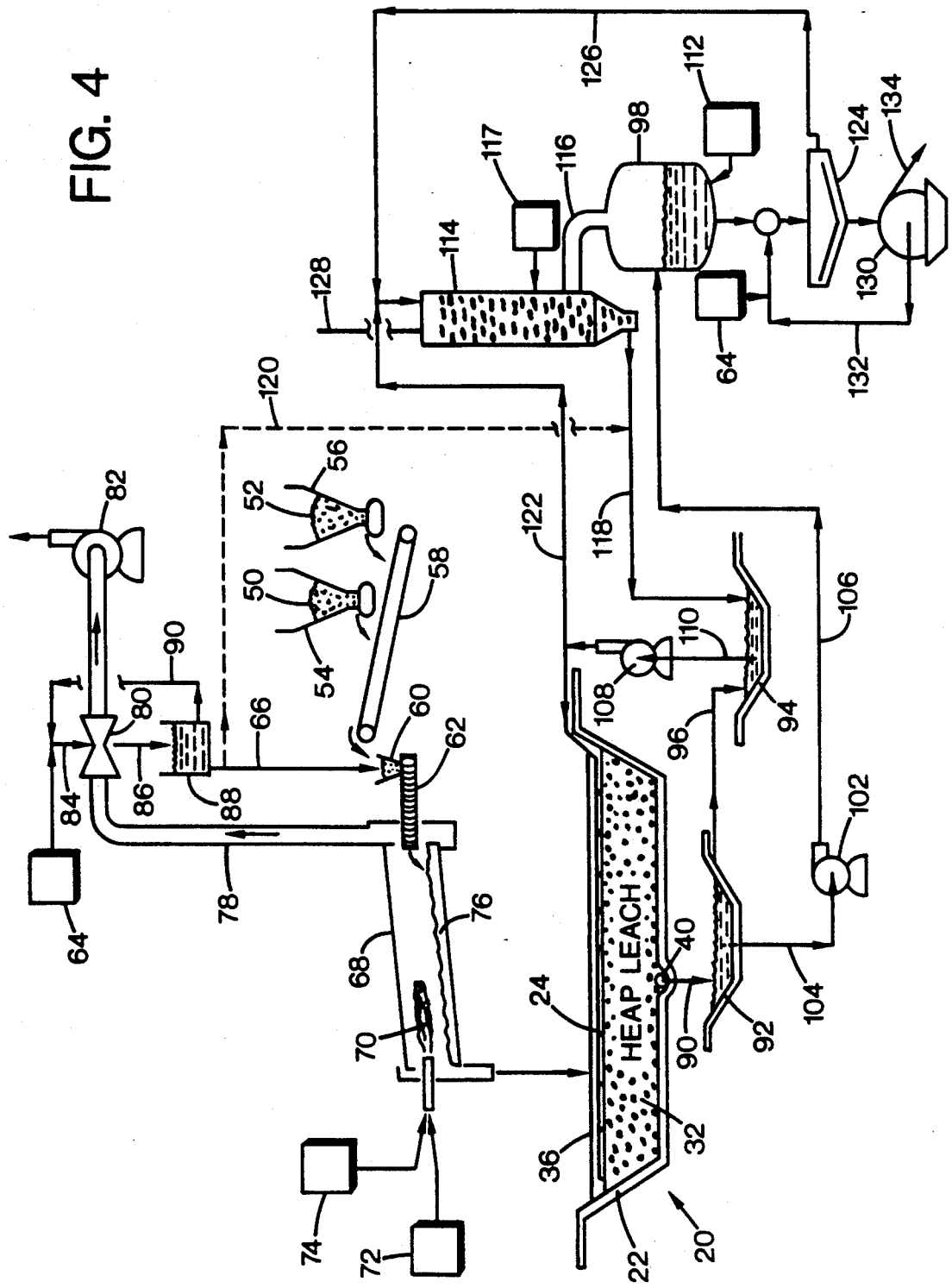
FIG. 4 is a process diagram of one embodiment of a method according to the present invention.

FIG. 4 is a schematic diagram of an industrial-scale process according to the present invention. (In FIG. 4, items that are the same as in FIGS. 3A and 3B have the same reference designators.) Shown are the leaching cell 20 comprising the liner 22, the heap 32, the irrigation conduit 24, the cover 36, and the drain 40.

The roasted agglomerates comprising the heap 32 are first prepared by blending flue dust or smelter sludge 50 and lime 52. The flue dust or sludge 50 and lime 52 are dispensed from hoppers 54 and 56, respectively, onto a conveyor 58 that carries the flue dust or sludge 50 and lime 52 to an input hopper 60 of a conventional pugging extruder 62 or analogous device. Water from a source thereof 64 (which includes water previously used for washing leached agglomerates) is added via a conduit 66 to the flue dust or sludge 50 and lime 52 entering the input hopper 60. The flue dust or sludge, lime, and water are blended, compacted, and formed into agglomerates in the pugging extruder 62.

After exiting the pugging extruder 62, the agglomerates enter the roaster 68 which can be a conventional rotary kiln or analogous appliance. Even though oxidation reactions that occur in the roaster 68 are exothermic, an additional energy source such as a flame 70 (fired by a mixture of air 72 and fuel 74 such as natural gas) is supplied as needed to the roaster 68.

Vapors will be liberated from the agglomerates during roasting if the roasting is performed improperly. As a safety precaution, vapor can be purged from the roaster 68 by a blower 82 through a conduit 78 and a scrubber 80. The scrubber 80 can be any suitable conventional type such as a venturi scrubber. The scrubber 80 removes any residual sulfur and arsenic present in vapor discharged from the roaster 78 that perchance were not fixed in the roasted agglomerates due to improper control of the roasting step. A suitable scrubber 80 utilizes water as a scavenging medium, delivered through a conduit 84 from the water source 64. If desired, water exiting the scrubber 80 can be routed through conduits 86 and 66 and utilized to make new agglomerates, thereby returning any arsenic and sulfur in the water to the agglomerates Also, if water conservation is important or desired, the water from the scrubber 80 can be routed through a recirculation loop comprised of a water reservoir 88 and a conduit 90.

After exiting the roaster 68, the resulting roasted agglomerates are preferably loaded into a heap-leaching cell 20, such as disclosed in FIGS. 3A and 3B, including the liner 22 containing the heap 32 of agglomerates, the irrigation conduit 24 for delivering lixiviant solution to the heap 32, the cover 36, and the drain line 40 for conducting pregnant liquor away from the heap 32. The drain line 40 discharges pregnant liquor (arrow 90) to a pregnant-liquor storage pond 92.

If desired, a portion of the pregnant liquor can be recycled to a lixiviant reservoir 94 via a conduit 96, which serves to elevate the ultimate concentration of leached metals such as copper, zinc, and/or nickel in the pregnant liquor before precipitating the leached metals therefrom. Continuous recycling of the pregnant liquor to the lixiviant reservoir 94, along with continuous withdrawal of a portion of the pregnant liquor from the storage pond 92 is a preferred scheme, particularly as the roasted agglomerates become more depleted in the leached metals after prolonged leaching Also, the lixiviant reservoir 94 is useful as a supply of lixiviant in the event of a process upset. Lixiviant solution is delivered from the reservoir 94 to the leach cell 20 via a pump 108 and conduits 110 and 24.

The pregnant liquor is routed to an ammonia boiler 98 via a pump 102 and conduits 104, 106 for precipitation of non-ferrous metals such as copper, zinc, and nickel. The pregnant liquor is heated to release ammonia vapor and precipitate copper hydroxide according to the following reactions:

$$Cu(NH_3)_4(NO_3)_2 + 2H_2O = Cu(OH)_{2(s)} + 2NH_4NO_3 + 2NH_3$$

$$Cu(NH_3)_4Cl_2 + H_2O = Cu(OH)_{2(s)} + 2NH_4Cl + 2NH_3$$

$$Cu(NH_3)_4SO_4 + 2H_2O = Cu(OH)_{2(s)} + (NH_4)_2SO_4 + 2NH_3$$

Similar precipitation reactions occur for zinc and nickel.

Boiling can be effected in the boiler 98 using steam 112, submerged burners (not shown), or any other convenient heat source. Boiling the pregnant liquor using a spray dryer (not shown) with incomplete drying as known in the art can be employed as an alternative to the boiler 98 if scaling of basic metal precipitates on the walls of the boiler 98 is a problem.

It is desirable to have a substantial concentration of the dissolved non-ferrous metals in the pregnant liquor in order to minimize energy consumption when boiling the pregnant liquor. Energy consumption is inversely proportional to the concentration of the dissolved metals in the pregnant liquor. Although heap leaching uses a comparatively small volume of lixiviant relative to the volume of roasted agglomerates, in contrast to other leaching methods, some recycling of pregnant liquor to lixiviant in order to increase nonferrous metal concentration therein prior to boiling may be required.

Ammonia vapor produced in the boiler 98 enters a condenser 114 through a conduit 116. The condenser 114 can be any of several vapor/liquid apparatus types known in the art. The condenser 114 condenses the ammonia vapor and combines the resulting ammonia liquid with recycled ammonium salt solution recovered downstream (discussed hereinbelow), thereby re-forming the lixiviant solution. Any additional ammonia that is required to maintain proper concentration thereof in the re-formed lixiviant can be supplied to the condenser 114 from a source 117 thereof. The re-formed lixiviant solution is routed through a conduit 118 to the lixiviant reservoir 94 for storage. Water can be added to the re-formed lixiviant solution, if required, through a conduit 120 to maintain a proper concentration. The condenser 114 forms a largely closed system, but minor venting of noncondensible gases may be required through a vent 128.

Also passing to the condenser 114 through a conduit 122 is any excess lixiviant solution delivered by the pump 108 but not percolated through the heap 32.

With a large lixiviant storage pond 94 in a reasonably cool climate, additional cooling of the lixiviant beyond passage through the condenser 114 is generally not required.

Basic precipitates of metals such as copper, zinc, and nickel produced in the boiler 98 are preferably separated from the pregnant liquor by any of several possible methods known in the art including, but not limited to, centrifugation or filtration. By way of example, FIG. 4 shows a filter 124. Filtrate, comprising mainly an aqueous solution of the ammonium salt, passing through the filter 124 is routed through a conduit 126 to the condenser 114 where the filtrate is combined with condensed ammonia to re-form the lixiviant solution. Precipitate captured by the filter 124 is passed through a centrifuge 130 or analogous device, if required, for further removal of filtrate therefrom. The removed filtrate is recycled via a conduit 132 and diluted with water 64, if required. Finally, the precipitate captured by the filter 124 is routed 134 to an end-use situs (not shown).

It is necessary to maintain a high concentration of ammonium ions in the lixiviant solution so as to keep the pH thereof sufficiently low to permit efficient formation of copper ammine complexes during leaching.

In order to further illustrate the invention, the following examples are provided.

EXAMPLES 1-7

Copper smelter flue dust was obtained from a site in Anaconda, Mont. Chemical analysis of the dust is provided in Table I.

TABLE I

| Characteristics of Anaconda Flue Dust | |
|---|---|
| Moisture content | 29.99% w/w |
| Solids Composition: | |
| Copper | 14.48% w/w |
| Total sulfur | 7.31% w/w |
| Total arsenic | 7.81% w/w |

The flue dust was blended with hydrated lime to form a viscous paste. The paste was pressed into cylindrical pellets having a diameter of about 1.27 cm and a length of about 1.5 cm. Median pellet weight was about 2.5 grams. The pellets were loaded into a boat and roasted at 650° C. in a tube furnace. During roasting, nitrogen was passed through the tube furnace, then through an absorbing train comprising an arsenic condenser-filter and an $SO_x$-absorbing solution of hydrogen peroxide. The absorbing train captured no detectable amounts of arsenic and sulfur, indicating that arsenic and sulfur were completely captured within the pellets.

After roasting, the pellets were crushed to accelerate the subsequent leaching step. The entire amount of crushed pellets was divided into aliquots which served as Examples 1-7. Each aliquot was leached by agitation in a different lixiviant solution for about 24 hours. Lixiviant formulations as well as data on leaching of copper and arsenic are summarized in Table II. Arsenic extractions were determined using atomic absorption analysis of the leachates and from analyses of leachate residues using standard wet-chemistry methods known in the art.

TABLE II

| | Lixiviant | | Pregnant Liquor | | Extraction | | pH | |
|---|---|---|---|---|---|---|---|---|
| Ex. | [NH$_3$] | [Ammonium Salt] | [Cu] | [As] | Cu (%) | As (%) | Begin | End |
| 1 | 4 M | None | 0.25 g/L | 0.01 g/L | 4.9 | 0.4 | 12.9 | 12.9 |
| 2 | None | 1.1 M (NH$_4$)$_2$CO$_3$ | 2.46 g/L | 0.707 g/L | 49.25 | 27.9 | ND | ND |
| 3 | 2.2 M | 1.1 M (NH$_4$)$_2$CO$_3$ | 2.79 g/L | 1.407 g/L | 72.1 | 55.5 | ND | ND |
| 4 | 4 M | 1.5 M (NH$_2$)$_2$SO$_4$ | 3.65 g/L | 0.083 g/L | 72.7 | 3.3 | ND | 10.48 |
| 5 | 4 M | 1.1 M (NH$_2$)$_4$NO$_3$ | 2.83 g/L | 0.008 g/L | 56.4 | 0.3 | 10.5 | 10.6 |
| 6 | 4 M | 1.0 M NH$_4$Cl | 3.03 g/L | 0.01 g/L | 60.4 | 0.4 | 10.5 | 10.7 |

TABLE II-continued

| | Lixiviant | | Pregnant Liquor | | Extraction | | pH | |
|---|---|---|---|---|---|---|---|---|
| Ex. | [NH$_3$] | [Ammonium Salt] | [Cu] | [As] | Cu (%) | As (%) | Begin | End |
| 7 | 4 M | 1.26 M NH$_4$Cl | 3.20 g/L | 0.008 g/L | 63.7 | 0.3 | 10.5 | 10.55 |

As indicated by Example 1, neither copper nor arsenic were appreciably extracted by a lixiviant comprised only of aqueous ammonia without any ammonium salt. The greatest amounts of copper were extracted from the roasted pellets whenever the lixiviant solution contained both aqueous ammonia and an ammonium salt at a pH from about 10 to about 11 (e.g., Examples 4-7). As discussed hereinabove, the ammonium salt in the lixiviant provided anions other than hydroxyl ion to balance the charge on the cupric ammine complex without generating an excessively high pH (greater than about 11).

In instances where the lixiviant solution included ammonium carbonate (Examples 2-4), it was found that environmentally significant amounts of arsenic dissolved from the pellets.

In contrast, lixiviant solutions containing ammonia and either ammonium chloride or ammonium nitrate (Examples 5-7) dissolved most of the copper from the roasted pellets but very little (less than one percent) of the arsenic. The corresponding low amounts of arsenic that would appear in the copper precipitate would not be a problem during re-smelting of the precipitate.

Use of ammonium sulfate (Example 4) produced intermediate results with about 3 percent of the arsenic dissolving from the pellets.

EXAMPLES 8-10

One purpose of these examples was to determine whether any copper-solubility limits existed for several possible lixiviants. As discussed hereinabove, an adequate concentration of copper in the pregnant liquor is required in order to conduct energy-efficient boiling and precipitation of copper from the pregnant liquor.

The Anaconda flue dust used in Examples 1-7 was blended with hydrated lime, where the amount of hydrated lime added was stoichiometric relative to the total amount of sulfur and arsenic in the dust. Again, cylindrical pellets were formed measuring about 1.27 cm diameter by about 1.5 cm long. The pellets were roasted as described in Examples 1-7, releasing no detectable amounts of sulfur or arsenic in the roaster flue gas. The roasted pellets had a specific gravity of 1.43 g/cm$^3$. As a result of their uniform size, the pellets had an apparent bulk density when heaped of only 42 lbs/ft$^3$ (0.68 g/cm$^3$).

The roasted pellets were divided into 100-gram aliquots representing Examples 8-10. Each aliquot was vat-leached without crushing in about 110 mL of one of the following lixiviants:

| Example | Lixiviant |
|---|---|
| 8 | 4 M NH$_3$ + 4 M NH$_4$Cl |
| 9 | 4 M NH$_3$ + 4 M NH$_4$NO$_3$ |
| 10 | 4 M NH$_3$ + 2 M (NH$_4$)$_2$SO$_4$ |

Figure 5:
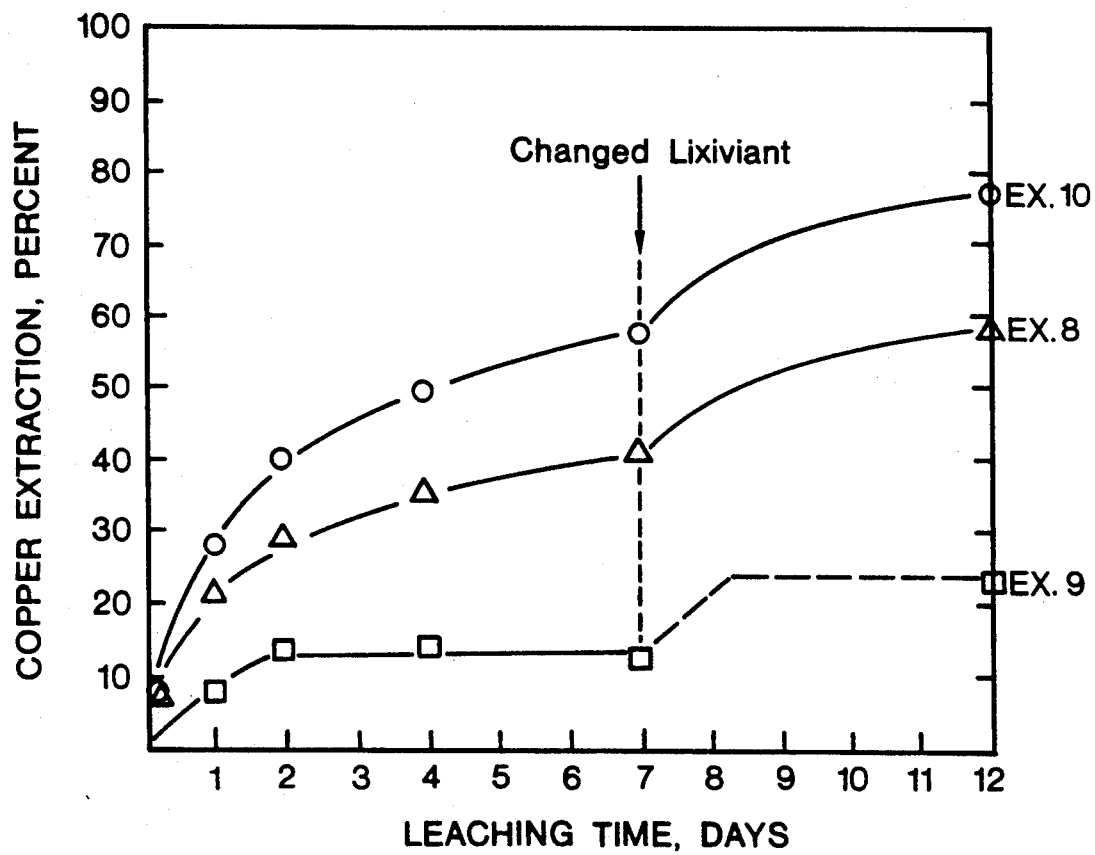
FIG. 5 shows plots of vat-leaching results obtained in Examples 8-10.

Leachings were allowed to proceed for seven days, with determinations of copper concentration in the lixiviants made after one, two, four, and seven days (FIG. 5).

As shown in FIG. 5, the lixiviant comprising ammonium nitrate (Example 9) was found to have a solubility limit for copper of about 13 g/L (reached at two days' leaching) beyond which copper tended to precipitate from the lixiviant. The precipitate was believed to be Cu(NH$_3$)$_2$NO$_3$, even though the copper-bearing crystals could not be conclusively identified by x-ray diffraction. However, many of the x-ray diffraction peaks and lattice spacings were similar to those of Cu(NH$_3$)-2NO$_3$.

Referring further to FIG. 5, no saturation precipitation occurred with lixiviants comprising either ammonium chloride (Example 8) or ammonium sulfate (Example 10). After seven days' leaching, the concentration of copper in the Example 8 lixiviant was 35.8 g/L, corresponding to an extraction of 40.5 percent of the copper from the pellets; and the concentration of copper in the Example 10 lixiviant was 50.8 g/L, corresponding to an extraction of 57.6 percent of the copper.

After the initial seven days' leaching, leaching of the pellets was continued with a fresh 110 mL of the respective lixiviant for five days. Afterward, the pellets were washed with water. As shown in FIG. 5, the lixiviant comprising ammonium nitrate (Example 9) became saturated again at about 13 g/L copper. The lixiviants comprising ammonium chloride (Example 8) and ammonium sulfate (Example 10) did not experience saturation precipitation.

Hence, after twelve days' leaching (seven days with the first 110-mL volume of lixiviant and five days with the second 110-mL volume of lixiviant), the lixiviant comprising ammonium nitrate (Example 9) extracted about 25 percent of the copper, the lixiviant comprising ammonium chloride (Example 8) extracted about 58 percent of the copper, and the lixiviant comprising ammonium sulfate (Example 10) extracted about 77 percent of the copper from the pellets (FIG. 5). Based upon these results, lime-roasted pellets of this size should be leached for about four to six weeks to obtain high extractions of copper in a commercial application.

No physical disintegration of the pellets was or after the 12-day leach experiments.

Arsenic assays in the lixiviants after seven days were as listed in Table III:

TABLE III

| Example | Ammonium Salt | [As] | [As] |
|---|---|---|---|
| 8 | NH$_4$Cl | 0.012 g/L | 1.6 × 10$^{-4}$ M |
| 9 | NH$_4$NO$_3$ | 0.010 g/L | 1.4 × 10$^{-4}$ M |
| 10 | (NH$_4$)$_2$SO$_4$ | 0.061 g/L | 8.2 × 10$^{-4}$ M |

The results in Table III are consistent with the results for arsenic given in Table II. These results are also consistent with the thermochemical data of Robins, *Met. Trans.* 12B:103-109 (1981). Somewhat higher solubilities of arsenic occur with the lixiviant comprising ammonium sulfate (Example 10) because of the tendency of gypsum to precipitate from this lixiviant and the lower calcium solubility therein. These arsenic data indicate that, at a leaching pH of about 10.5, calcium arsenate is extremely stable.

I claim:

1. A method for treating a smelter by-product so as to recover copper, nickel, zinc, an cobalt metal therefrom and convert any arsenic and sulfur in the smelter by-product into non-leachable forms of arsenic and sulfur, the method comprising:
   (a) mixing the smelter by-product with hydrated lime to form a paste;
   (b) forming the paste into agglomerates;
   (c) roasting the agglomerates in air at a temperature sufficient to oxidize the arsenic and sulfur therein and cause said oxidized arsenic and sulfur to react with the lime in the agglomerates to form non-leachable arsenic-containing and sulfur-containing calcium compounds within the roasted agglomerates; and
   (d) contacting the roasted agglomerates with a basic aqueous lixiviant solution comprising dissolved ammonia and an ammonium salt so as to dissolve copper, nickel, zinc and cobalt from the roasted agglomerates into the lixiviant solution, thereby converting the lixiviant solution to a pregnant liquor enriched in said copper, nickel, zinc and cobalt.

2. A method as recited in claim 1 wherein the ammonium salt is selected from a group consisting of ammonium chloride, ammonium sulfate, and ammonium nitrate.

3. A method as recited in claim 1 including the step of separating the pregnant liquor from the roasted agglomerates.

4. A method as recited in claim 3 including the step of heating the separated pregnant liquor sufficiently to cause (a) the dissolved copper, nickel, zinc and cobalt in the pregnant liquor to form a basic metal precipitate in the pregnant liquor and (b) the ammonia in the pregnant liquor to vaporize, thereby leaving the ammonium salt dissolved in the pregnant liquor.

5. A method as recited in claim 4 including the step of condensing the ammonia vapor.

6. A method as recited in claim 4 including the step of separating the basic metal precipitate from the aqueous solution of the ammonium salt.

7. A method as recited in claim 6 including the steps of condensing the ammonia vapor and combining the condensed ammonia vapor with the aqueous solution of the ammonium salt so as to re-form the lixiviant solution.

8. A method as recited in claim 6 wherein the step of separating the basic metal precipitate from the aqueous solution of the ammonium salt comprises filtering the basic metal precipitate from said aqueous solution.

9. A method as recited in claim 1 wherein the step of contacting the roasted agglomerates with a basic aqueous lixiviant solution comprises vat-leaching the roasted agglomerates with the lixiviant solution.

10. A method as recited in claim 9 wherein the step of heating the separated pregnant liquor comprises boiling said pregnant liquor to form a basic metal precipitate, ammonia gas, and an aqueous solution of the ammonium salt.

11. A method as recited in claim 1 wherein the step of contacting the roasted agglomerations with a basic aqueous lixiviant solution comprises heap-leaching the roasted agglomerates with the lixiviant solution.

12. A method as recited in claim 11 wherein the roasted agglomerates are leached in a cell having a substantially water-impervious lining and the cell is used as the final repository of the agglomerates after the agglomerates have been leached.

13. A method as recited in claim 11 wherein the step of heating the separated pregnant liquor comprises boiling said pregnant liquor so as to cause the pregnant liquor to form a basic metal precipitate, ammonia gas, and an aqueous solution of the ammonium salt.

14. A method as recited in claim 13 including the steps of:
   separating the basic metal precipitate from the aqueous solution of the ammonium salt; and
   condensing the ammonia vapor and combining the condensed ammonia vapor with the aqueous solution of the ammonium salt, thereby re-forming the lixiviant solution.

15. A method as recited in claim 1 wherein the smelter by-product is mixed with the hydrated lime so as to combine four moles of hydrated lime per two moles of arsenic and one mole hydrated lime per mole of sulfur in the smelter by-product.

16. A method as recited in claim 1 wherein the agglomerates are roasted at a temperature within a range of about 450° C. and 800° C.

17. A method as recited in claim 16 wherein the agglomerates are roasted at a temperature of about 650° C.

18. A method as recited in claim 1 wherein the roasted agglomerates are contacted with the lixiviant solution at a pH within a range of about 10 to about 11.

19. A method for recovering copper, zinc, cobalt and nickel from smelter flue dust while rendering the flue dust capable of being disposed of in a natural environment without leaching heavy metals, sulfur, or arsenic into said natural environment, the method comprising:
   (a) mixing the flue dust with hydrated lime to form a paste;
   (b) forming the paste into agglomerates;
   (c) roasting the agglomerates in air at a temperature sufficient to oxidize the arsenic and sulfur in the pellets and cause said arsenic and sulfur to react with the lime to form roasted agglomerates comprising non-leachable arsenic-containing sulfur-containing calcium compounds;
   (d) dissolving copper, zinc, cobalt and nickel from the roasted agglomerates by leaching said agglomerates with a basic aqueous lixiviant solution, comprising dissolved ammonia and an ammonium salt, without dissolving said calcium compounds in the roasted agglomerates, thereby forming leached agglomerates and converting the lixiviant solution to a pregnant liquor; and
   (e) separating the leached agglomerates from the pregnant liquor.

20. A method as recited in claim 19 including the step of boiling the pregnant liquor so as to cause the pregnant liquor to form (a) basic precipitates of copper, zinc, cobalt and nickel, (b) an aqueous solution of the ammonium salt, and (c) an ammonia gas that volatilizes from the ammonium salt solution.

21. A method as recited in claim 20 including the step of separating the basic precipitates from the aqueous solution of the ammonium salt.

22. A method as recited in claim 20 including the steps of condensing the ammonia vapor and combining the condensed ammonia vapor with the aqueous solution of the ammonium salt, thereby re-forming the lixiviant solution.

23. A method as recited in claim 19 wherein the step of leaching the roasted agglomerates comprises vat-leaching said agglomerates with the basic aqueous lixiviant solution.

24. A method as recited in claim 19 wherein the step of leaching the roasted agglomerates comprises heap-leaching said agglomerates with the basic aqueous lixiviant solution.

25. A method as recited in claim 24 wherein the roasted agglomerates are leached in a cell having a substantially water-impervious lining and the cell is used as a final repository of the leached agglomerates in said natural environment after the leached agglomerates have been leached.

26. A method as recited in claim 19 wherein the agglomerates are roasted at a temperature within a range of about 450° C. to about 800° C.

27. A method as recited in claim 19 wherein the roasted agglomerates are leached with the lixiviant solution at a pH of about 10 to 11.

28. A method for disposing of a smelter by-product, comprising:
  (a) mixing the smelter by-product with hydrated lime to form a paste;
  (b) forming the paste into agglomerates;
  (c) roasting the agglomerates in air at a temperature sufficient to oxidize the arsenic and sulfur in the agglomerates and cause the oxidized arsenic and sulfur to react with the lime in the agglomerates to form non-leachable arsenic- and sulfur-containing compounds within the roasted agglomerates;
  (d) dissolving copper, zinc, cobalt and nickel from the roasted agglomerates by leaching said agglomerates with a basic aqueous lixiviant solution, comprising ammonia and an ammonium salt, without dissolving the arsenic- and sulfur-containing compounds in the roasted agglomerates, thereby converting the lixiviant solution to a pregnant liquor enriched with dissolved copper, zinc, cobalt and nickel;
  (e) separating the leached agglomerates from the pregnant liquor;
  (f) boiling the pregnant liquor so as to cause the pregnant liquor to form basic copper, zinc, cobalt and nickel precipitates, ammonia gas, and an aqueous solution of the ammonium salt;
  (g) separating the basic precipitates from the aqueous solution of the ammonium salt; and
  (h) discarding the leached agglomerates.

29. A method as recited in claim 28 wherein the ammonium salt is selected from the group consisting of ammonium chloride, ammonium nitrate, and ammonium sulfate.

30. A method as recited in claim 28 wherein the step of leaching the roasted agglomerates comprises heap-leaching said agglomerates with the basic aqueous lixiviant solution.

31. A method as recited in claim 28 wherein the step of leaching the roasted agglomerates comprises vat-leaching said agglomerates with the basic aqueous lixiviant solution.

32. A method as recited in claim 28 wherein the roasted agglomerates are leached in a lined cell used as the final repository of the agglomerates after the agglomerates have been leached.

33. A method as recited in claim 28 including the steps of condensing the ammonia gas and combining the condensed ammonia gas with the aqueous solution of the ammonium salt, thereby re-forming the lixiviant solution.

34. A method as recited in claim 28 wherein the agglomerates are roasted at a temperature within a range of about 450° C. to about 800° C.

35. A method as recited in claim 28 wherein the roasted agglomerates are leached with the lixiviant solution at a pH of about 10 to 11.

* * * * *

UNITED STATES PATENT AND TRADEMARK OFFICE
CERTIFICATE OF CORRECTION

PATENT NO. : 5,234,669
DATED : August 10, 1993
INVENTOR(S) : Robert W. Bartlett

It is certified that error appears in the above-identified patent and that said Letters Patent is hereby corrected as shown below:

On the Title Page:

Item [56], Other Publications, "Taylor et al., 'Lime Roasting of Pyrite,' presentation at the Annual Meeting of the Society of Mining Engineers, Salt Lake City, Utah (February 18, 1990)." should be --Taylor et al., "Lime Roasting of Pyrite," presentation at the Annual Meeting of the Society of Mining Engineers, Salt Lake City, Utah (February 28, 1990).--;

Item [57], Abstract, line 9, "lie" should be --lime--;

In the Specification:

Column 2, line 32, "sulfur Valuable" should be --sulfur. Valuable--;

Column 2, line 38, "salt The" should be --salt. The--;

Column 3, line 19, "lead The" should be --lead. The--;

Column 3, line 21, "smelted The" should be --smelted. The--;

Column 4, line 11, "roasting Since" should be --roasting. Since--;

Column 4, line 30, "completed The" should be --completed. The--;

Column 4, line 63, "arsenic Hydrated" should be --arsenic. Hydrated--;

UNITED STATES PATENT AND TRADEMARK OFFICE
CERTIFICATE OF CORRECTION

PATENT NO. : 5,234,669

DATED : August 10, 1993

INVENTOR(S) : Robert W. Bartlett

It is certified that error appears in the above-identified patent and that said Letters Patent is hereby corrected as shown below:

Column 5, line 23, "kiln Similar" should be --kiln.  Similar--;

Column 5, line 30, "leaching The" should be --leaching.  The--;

Column 5, line 49 (specification page 12, line 7), "in situ" should be --$\underline{in\ situ}$--;

Column 6, line 26 (specification page 13, line 23), "$Ca_3AsO_3)_{2(s)}+O_{2(g)}=Ca_3(AsO_4)_{2(s)}$" should be --$Ca_3(AsO_3)_{2(s)} + O_{2(g)} = Ca_3(AsO_4)_{2(s)}$--;

Column 6, line 44 (specification page 14, line 12), "solution Because" should be --solution.  Because--;

Column 6, lines 58-59 (specification page 14, line 26), "$Ca_3(AsO_4)_2+3(NH_4)CO_3=3CaCO_3(s)+2(NH_4)_3AsO_4$" should be --$Ca_3(AsO_4)_2 + 3(NH_4)CO_3 = 3CaCO_3(s) + 2(NH_4)_3AsO_4$--;

Column 7, lines 4-5 (specification page 15, line 11), "$CuO_{(s)}+2NH_4NO_3+2NH_3=Cu(NH_3)_4(NO_3)_2+H_2O$" should be --$CuO_{(s)} + 2NH_4NO_3 + 2NH_3 = Cu(NH_3)_4(NO_3)_2 + H_2O$--;

Column 8, line 43 (specification page 19, lines 1-2), "handling FIGS." should be --handling.  FIGS.--;

Column 9, line 36 (specification page 21, line 5), "agglomerates After" should be --agglomerates.  After--;

UNITED STATES PATENT AND TRADEMARK OFFICE
CERTIFICATE OF CORRECTION

PATENT NO. : 5,234,669

DATED : August 10, 1993

INVENTOR(S) : Robert W. Bartlett

It is certified that error appears in the above-identified patent and that said Letters Patent is hereby corrected as shown below:

Column 9, line 44 (specification page 21, line 13), "agglomerates In" should be --agglomerates. In--;

Column 10, line 37 (specification page 23, line 18), "agglomerates Also," should be --agglomerates. Also,--;

Column 10, line 60 (specification page 24, line 13), "leaching Also," should be --leaching. Also,--;

Column 11, lines 4-5 (specification page 24, line 25), "$Cu(NH_3)_4(NO_3)_2+2H_2O=Cu(OH)_{2(s)}+2NH_4NO_3+2NH_3$" should be --$Cu(NH_3)_4(NO_3)_2 + 2H_2O = Cu(OH)_{2(s)} + 2NH_4NO_3 + 2NH_3$--;

Column 11, lines 7-8 (specification page 24, line 26), "$Cu(NH_3)_4Cl_2+H_2O=Cu(OH)_{2(s)}+2NH_4Cl+2NH_3$" should be --$Cu(NH_3)_4Cl_2 + H_2O = Cu(OH)_{2(s)} + 2NH_4Cl + 2NH_3$--;

Column 11, lines 9-10 (specification page 24, line 27), "$Cu(NH_3)_4SO_4+2H_2O=Cu(OH)_{2(s)}+(NH_4)_2SO_4+2NH_3$" should be --$Cu(NH_3)_4SO_4 + 2H_2O = Cu(OH)_{2(s)} + (NH_4)_2SO_4 + 2NH_3$--;

Column 12, Table II, Example 4, under the subheading "Lixiviant [Ammonium Salt]," (specification page 28, line 31), "1.5 $\underline{M}$ $(NH_2)_2SO_4$" should be --1.5 $\underline{M}$ $(NH_4)_2SO_4$--;

Column 12, Table II, Example 5, under the subheading "Lixiviant [Ammonium Salt]," (specification page 28, line 33), "1.1 $\underline{M}$ $(NH_2)_4NO_3$" should be --1.1 $\underline{M}$ $(NH_4)_2NO_3$--;

UNITED STATES PATENT AND TRADEMARK OFFICE
CERTIFICATE OF CORRECTION

PATENT NO. : 5,234,669

DATED : August 10, 1993

INVENTOR(S) : Robert W. Bartlett

It is certified that error appears in the above-identified patent and that said Letters Patent is hereby corrected as shown below:

Column 14, line 47
"was or after" should be --was apparent during or after--;

Claim 1, column 15, line 22
line 21), "in said copper," should be --in copper,--;

Claim 19, column 16, line 29
"cobalt" should be --cobalt,--;

Claim 19, column 16,
"cobalt" should be --cobalt,--;

Claim 20, column 16, line 56
"cobalt" should be --cobalt,--;

Claim 28, column 17, line 32 (Amendment dated November 23,
"cobalt" should be --cobalt,--;

Claim 28, column 18, line 1
"cobalt" should be --cobalt,--;

UNITED STATES PATENT AND TRADEMARK OFFICE
CERTIFICATE OF CORRECTION

PATENT NO. : 5,234,669

DATED : August 10, 1993

INVENTOR(S) : Robert W. Bartlett

It is certified that error appears in the above-indentified patent and that said Letters Patent is hereby corrected as shown below:

```
Claim 28, column 18, line 6 (Amendment dated November 23,
1992, page 2, line 10), "cobalt" should be --cobalt,--.
```

Signed and Sealed this

Twenty-sixth Day of April, 1994

Attest:

BRUCE LEHMAN

*Attesting Officer*  *Commissioner of Patents and Trademarks*